Figure 1:
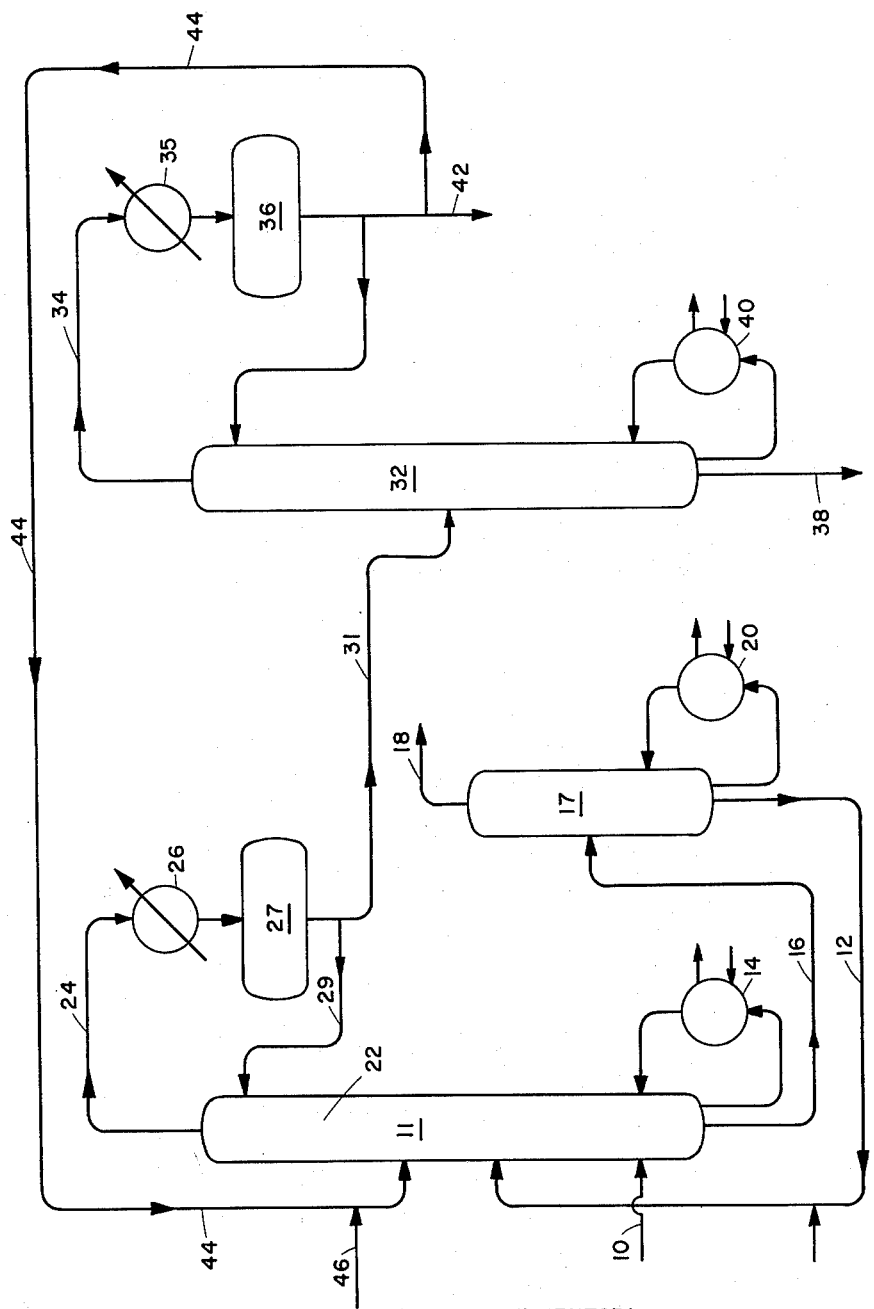

INVENTOR:
CLINE BLACK
BY: T. Reid Anderson
HIS ATTORNEY

United States Patent Office 2,981,663
Patented Apr. 25, 1961

2,981,663

EXTRACTIVE DISTILLATION OF AROMATIC COMPOUNDS

Cline Black, Berkeley, Calif., assignor to Shell Oil Company, a corporation of Delaware Filed May 5, 1958, Ser. No. 733,016

3 Claims. (Cl. 202—39.5)

This invention relates to an extractive distillation for toluene and xylene recovery from hydrocarbon mixtures utilizing a phenol type solvent. The process of the invention is particularly suitable for the separation of these materials from close boiling mixtures which contain a material or materials that normally azeotrope with the phenol type solvent, thereby resulting in some phenol loss in the raffinate passing overhead from the extractive distillation zone. The improved process of the invention may be operated to reduce signficantly or substantially forestall the loss of the phenol solvent in the raffinate.

Toluene and the xylenes, chemicals formerly obtained principally from the coal tar industry, have been in recent years recovered in increasingly larger amounts from the petroleum derived streams, such as reformed naphthas. These petroleum streams contain hydrocarbon compounds whose normal volatilities are approximately the same as the aromatic materials being recovered and for this reason the separation of the toluene and the xylenes cannot be satsifactorily achieved through conventional fractional distillation. Hence, it has been necessary to resort to the more costly process of extractive distillation in an attempt to obtain efficient separation of the aromatics from the close boiling components of the hydrocarbon mixtures. Conventionally, toluene is recovered from a $C_7$ mixture and the xylenes are removed from a relatively narrow $C_8$ fraction.

The principal extractive distillation solvent used for the separation of toluene is phenol. Unfortunately, it has not been possible generally to operate the extractive distillations without some phenol loss occurring overhead in the raffinate stream. In order to remedy the situation, the raffinate has been passed through a knock-back or rectification section for the purpose of removing the phenol from the raffinate. The knock-back section is normally placed above the extractive distillation zone within the same column. However, even this approach has not proven fully successful since nearly all of the toluene enriched feed streams carry a material or materials which azeotrope with the phenol. For example, $C_7$ feed stocks suitable for toluene extraction inevitably carry some $C_8$ saturated hydrocarbons and if the higher boiling components of these materials are present in any significant amount, the phenol cannot be completely separated from the raffinate stream through simple rectification in the knock-back section. It has been suggested that a better prefractionation to furnish a more narrow cut of the reformed naphtha to the extractive distillation zone, eliminating the higher boiling $C_8$ saturated hydrocarbons, would correct the situation. However, this is not the complete answer since nearly all of the $C_8$ paraffins with the exception of 2,2,4-trimethyl pentane and n-octane azeotrope with the toluene and hence, prefractionation to remove the $C_8$ without significant loss of toluene is clearly impractical, if not impossible. Additionally, it has been generally experienced that the phenol loss is aggravated if the extractive distillation column is operated to obtain a high recovery of toluene. For the foregoing reasons, it has been necessary to compromise between minimum phenol loss and maximum toluene recovery in the operation of toluene extractive distillation systems.

Cresylic acid (cresol) mixtures have been conventionally used for extractive distillation of the xylenes from their $C_8$ fractions. Again, as in the instance of the toluene, the material has been chiefly recovered from reformed naphthas, but here prefractionated to obtain a $C_8$ fraction. There has likewise been a solvent loss in the raffinate stream; but generally the amount of the cresol solvent lost has not been on the same scale, but it is neverthelss a loss that would be desirable to reduce.

It is an object of the present invention to provide an improved extractive distillation method for the recovery of toluene or the xylenes wherein there is a reduced loss of the phenol type solvent in the raffinate of the process. In the instance of toluene recovery, it is the object of the invention to provide an improved extractive distillation process utilizing phenol as the solvent, which permits an economically feasible, high recovery of toluene. A still further object is to provide an improved extractive distillation process for the recovery of xylenes with a reduced or practically no cresol solvent loss. Other objects and advantages of this invention will become apparent from the following description taken in conjunction with the accompanying drawings wherein are set forth by way of illustration and example certain embodiments of this invention.

Figure 2:
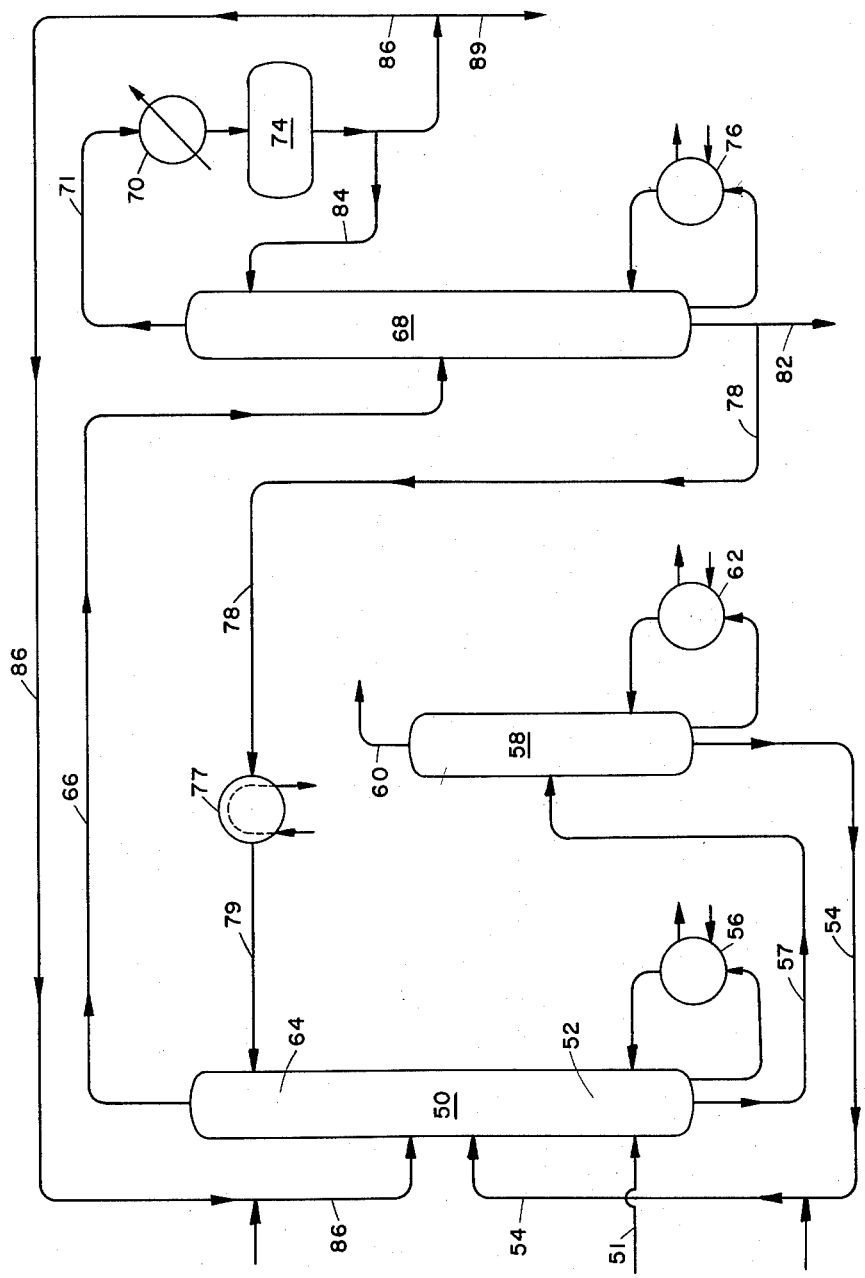

Fig. 1 is a schematic diagram of a preferred system for performing the process; and Fig. 2 is a schematic diagram of an alternative system.

It has now been discovered that in an extractive distillation using a phenol type solvent for the recovery of either toluene or the xylenes from hydrocarbon feed mixtures containing a material or materials which normally azeotrope with the phenol solvent that the loss of the phenol escaping overhead in the raffinate from the process can be significantly reduced or substantially prevented by directing the raffinate through a solvent knock-back or rectification zone in which there is maintained a monocyclic aromatic of the same carbon number as the phenol solvent in liquid phase of at least a portion of the rectification zone in an amount sufficient to reduce significantly the volatility of the phenol relative to the azeotrops former. The presence of the monocyclic aromatic results in a more complete rectification of the phenol type solvent from the raffinate and permits the withdrawal of the hydrocarbon raffinate from the top of the rectification section with a significantly reduced phenol content relative to that experienced in the absence of the monocyclic aromatic material. In the preferred process of the invention, the monocyclic aromatic is admitted to a tray at a lower level of the rectification zone. This arrangement permits maintaining of liquid monocyclic aromatic material in each succeeding tray above the tray of introduction, thus reducing the volatility of the phenol relative to its normal azeotrope former on each of the trays and thereby facilitating the rectification of the raffinate to knock-back its phenol content. In toluene recovery, the phenol type material generally employed is phenol itself and here the monocyclic aromatic employed in the rectification section will be benzene. In xylene recovery, toluene will be admitted as the volatility modifier to the rectification section to assist in the knock-back of the cresol solvent.

The process of the invention may be used to recover toluene from various sources, including relatively wide spectrum feeds and prefractionated feed stocks of a limited hydrocarbon range. Preferably, the feed stock is a prefractionated reformed naphtha stream, such as a straight run naphtha which has been reformed over a platinum catalyst to increase its aromatic content. Generally, the stream to the extractive distillation column will contain chiefly $C_7$ paraffins and aromatics with small contaminating amounts of $C_6$'s and some $C_8$ hydrocarbons. A suitable feed stock may have, for example, a boiling range of 155–275° F. and preferably a more limited range of say 176° F. to about 260° F. In the usual practice, extending the upper boiling limit to above about 250° F. leads to excessive loss of phenol in the overhead raffinate. The present process is not, however, limited in this respect and as a consequence, a prefractionation to prepare the feed can be carried out for optimum toluene recovery. The prefractionated reformed naphtha streams generally have an aromatic content (almost exclusively toluene) approaching 50%. Some reformed streams may, however, contain toluene in appreciably lower amounts.

Preferably the feed stock to the xylene separation is a reformed naphtha stream prefractionated to supply a $C_8$ fraction. A suitable feed stock for xylene separation will have a boiling range extending say from 260° F. to approximately 315° F.

The conditions of the extractive distillation column, including temperature, pressure, and the naphtha feed:solvent ratio need not be affected by the introduction of the monocyclic aromatic to the rectification zone overlying the extractive distillation zone, except to the extent that the presence of the monocyclic aromatic permits an increased recovery of either the toluene or xylenes which in turn may make desirable an increase solvent flow. Normally, the solvent-to-feed ratio will be in the range of 2.5–5 parts of solvent to 1 part of feed on a volume basis.

The monocyclic aromatic introduced to the rectification zone may be employed in varying amounts to reduce the volatility of the phenol type solvent relative to the raffinate. The monoaromatic should be used in amounts sufficient to substantially reduce or forestall loss of the phenol in the overhead gas stream and generally speaking, it is recommended that the monocyclic aromatic be used in a quantity within the range of 0.3 to 2.0 volumes per volume of hydrocarbon withdrawn as the overhead product (raffinate). Preferably, the monocyclic aromatic is admitted to the rectification zone in an amount of about 0.7 volume per volume of the raffinate.

In one embodiment of the process of the invention, the overhead vapor stream (from the rectification zone) made up of the raffinate and monocyclic aromatic is condensed and collected in a receiver, with a portion of the condensate being returned to a tray at an upper level of the rectification zone as reflux. The rest of the condensate is passed to a fractionating column where it is distilled, with the monocyclic aromatic being taken overhead, condensed and recycled to the rectification zone, preferably to a tray at a lower level of that zone.

In an alternative scheme, the overhead vapor stream from the rectification zone passes directly without condensation to a fractionating column where it is split into a monoaromatic vapor stream and a liquid portion which is removed from the base of the fractionating column and recycled at least in part as reflux to a tray at an upper level of the phenol rectifying zone. If the feed stream for a toluene separation to the extractive distillation column should contain a significant amount of $C_6$ saturates, these $C_6$ saturates will azeotrope with the benzene in the rectification section, passing overhead with the benzene to the condenser and receiver and hence, will return in the recycle from the fractionation column to the rectification zone. In such event, it will be necessary in order to prevent $C_6$ build up to pass a slip or purge stream of the recycle to further processing to separate the saturated material from the benzene. If an extractive distillation column for the recovery of benzene is also operated at the same location, the separation is most conveniently made by including the slip stream in the feed to that column. Of course, if $C_6$ saturates are absent from the feed to the toluene extractive distillation column, no slip stream will be required.

Packed towers employing Raschig rings and other packings may be used in the tray column. However, packed columns are not widely used in the industry principally because of the tendency for the liquid to channel and drain down along the walls rather than through the packings. The term tray or plate tower is used generically herein to include packed towers.

Referring to Fig. 1 of the drawing, a prefractionated catalytic naphtha reformate containing approximately 43% $C_7$ paraffins and around 48.5% toluene is passed via a line 10 to a lower section of an extractive distillation column 11. The $C_7$ paraffins are mainly 2-methyl hexane, 3-methyl hexane and normal heptane. The stream also contains approximately 3% of $C_8$ paraffins and other minor amounts of cyclopentanes and cyclohexane. The boiling range of the mixture extends from approximately 154° F. to 260° F. The feed stream is intoduced either as a vapor or as a liquid at just below its boiling point. Phenol in a solvent:feed volume ratio of 3 : 1 enters the column adjacent the top of the extractive distillation zone through a line 12. Heat needed for the operation of the column is supplied by a reboiler 14. The tower is maintained at a pressure of about 20 to 25 p.s.i.a. The descending phenol solvent extracts the toluene from the hydrocarbon feed and is removed in a solvent extract phase from the base of the tower via a line 16 and passed to a conventional solvent stripper 17. The conditions for operation of the stripper are conventional with the product toluene being removed overhead from the stripper via a line 18 and the heat necessary for the operation of the stripper provided through a reboiler 20. The stripped solvent is returned to the extractive distillation column through the previously mentioned line 12.

The raffinate from the extractive distillation zone of the column passes upwardly into an overlying rectification or knock-back zone 22 which constitutes the upper portion of the column. This zone is provided with several plates, for example, ten or so, the actual number depending on the usual design factors, such as the amount of reflux, volume of raffinate and the relative volatility of the raffinate and phenol and other well known factors. As previously pointed out, the raffinate from the underlying extractive distillation zone of the column will contain some phenol which, due to the presence of the azeotrope formers, cannot normally be separated from the raffinate by ordinary distillation. In order to accomplish this separation, benzene is introduced to a lower level of the rectification zone. Preferably, the benzene is admitted at a level which is a few trays removed from the top of the extractive distillation zone proper, thus providing trays for the stripping of the benzene out of the downwardly moving liquid from the rectification zone. The benzene is here introduced in the preferred amount of about 0.7 volume per volume of the raffinate. By recycling the benzene to this lower level of the zone, liquid benzene will appear on each succeeding tray above the point of introduction, thus assuring a reduced volatility of the phenol relative to its normal azeotope formers on each of the trays. Depending upon the conditions of the operation and design of the extractive distillation zone, it is possible either to reduce significantly the phenol content of the raffinate or to forestall substantially the loss of any phenol in the saturated hydrocarbons. Phenol losses of 0.2–0.7%, based on the weight of raffinate are commonly experienced in the absence of the use of the benzene.

The raffinate substantially free of phenol leaves the top of the rectification zone via a line 24 passing to a condenser 26 where the vapor is cooled and the condensate collected in a receiver 27 which follows the condenser. The condensate in part is returned as reflux through a line 29 to a tray in the top portion of the rectification zone. The amount of reflux required, of course, varies with the design but normally approximately 20 to 30% of the condensate is so returned. The rest of the condensate moves through a line 31 to a fractionating column 32.

In the fractionating column the benzene is recovered overhead via a line 34, cooled in a condenser 35 and the benzene condensate collected in a receiver 36. The hydrocarbon saturates, principally $C_7$ and $C_8$ materials leave the fractionating column via a bottom line 38. The heat necessary for the operation of the fractionating column is supplied through a reboiler 40. Since the feed stream to the extractive distillation column contains a minor but significant amount of $C_6$ saturates, those materials will have passed overhead with the benzene vapors from the fractionating column 32 and collected with the benzene condensate in the receiver 36. It will be necessary in order to prevent a build up of $C_6$ saturates in the recycle stream to remove a slip stream from the recycle and send it via a line 42 to a benzene extractive distillation column. The benzene recycle proper is recycled via a line 44 to the previous mentioned tray at the lower level of the rectification zone. Benzene make up is supplied to the recycle line through a line 46.

With reference to the system illustrated in Fig. 2, the reformed toluene containing stream enters an extractive distillation column 50 through a line 51. A stream of phenol solvent is admitted to a top portion of an extractive distillation zone 52 of the column via a line 54. The heat necessary for the operation of the tower is supplied through a reboiler 56. The fat extract phase containing the toluene and solvent leave the bottom of the extractive distillation zone in a line 57 and is admitted to a central section of a solvent stripper 58 where the product toluene is taken overhead through a line 60 to storage. The heat requirements of this stripper, which is conventional in design and operation in all respects, is supplied by a reboiler 62. The phenol stripped of the toluene returns to the extractive distillation column through the line 54. The raffinate leaving the extractive distillation zone of the column contains some small amount of phenol which if not removed would represent a loss in the operation of the process, and hence the raffinate is passed through a rectification zone 64 above the extractive distillation zone 52 of the column. The benzene as in the system of Fig. 1 is admitted to a lower level of the rectification zone and serves as a volatility modifier permitting substantially complete rectification of the phenol solvent and the raffinate. Vapor benzene and raffinate leave the top of the column through a line 66 which opens into a lower section of a fractionating column 68. Here the benzene separates overhead from the $C_7$ and $C_8$ saturates of the raffinate, passing to a condenser 70 through a line 71. The condensate is collected in a receiver 74. Heat required for the operation of the tower is supplied by a reboiler 76. The raffinate proper is removed from the bottom of the fractionating tower and is passed in part to a cooler 77 via a line 78. Here the raffinate's temperature is dropped to a suitable refluxing temperature and from there the cooled stream goes through a line 79 to an upper tray of the rectification zone of the column 10. The raffinate not recycled as reflux is removed from the system via a line 82. The benzene reflux necessary for the operation of the fractionating tower 68 is supplied in a line 84 and the rest of the benzene condensate, except for a slip stream, is recycled to the process through a line 86. As in the system described in Fig. 1, a slip or purge stream is continuously withdrawn from the recycle stream 86 and passed in a line 89 to a system for the separation of the $C_6$ saturates. Alternatively, in the system of Fig. 1, stream 34 (or stream 42) from the top of column 32 could be fed directly to a benzene extractive distillation column and the benzene required for the operation of the toluene knock-back section could be continuously withdrawn from the product stream of that benzene unit. A similar arrangement could be utilized for the embodiment of Fig. 2, taking say the stream 71 to the benzene unit.

The two systems of Figs. 1 and 2 have been described with reference to the recovery of toluene from a suitable $C_7$ hydrocarbon mixture. However, it is to be understood that the systems may be employed for the removal of the xylenes from appropriate $C_8$ mixtures and in such instance the solvent used for the xylene recovery will be cresol and the volatility modifier utilized in the rectification zone will be toluene. The commercially available cresol or cresylic acid is a mixture of the three cresol isomers. The term cresol has been used herein and in the appended claims to include mixtures as well as pure cresol compounds.

I claim as my invention:

1. In an extractive distillation process using a phenol as the solvent introduced into the upper section of an extractive distillation zone above the feed entry, for the recovery of an aromatic material selected from the group consisting of toluene and xylenes from a hydrocarbon feed containing a compound which azeotropes with phenol thereby causing some of the phenol to pass overhead with the raffinate, the phenol solvent having at least one less carbon atom per molecule than the aromatic material to be recovered, and wherein there is provided a rectification zone having a number of liquid carrying plates beyond the extractive distillation zone to further the separation of the solvent from the raffinate, the improvement which comprises introducing a monocyclic aromatic stream into the lower level of the rectification zone and causing it to pass into the liquid of the trays of the rectification zone and maintaining the monocyclic aromatic liquid phase thereon, the amount of monocyclic aromatic being 0.3 to 2.0 volumes of monocyclic aromatic per volume of raffinate, sufficient to reduce significantly the loss of phenol in the raffinate, said monocyclic aromatic being further characterized by its non-azeotroping property with phenol and having the same carbon number as the phenol solvent, withdrawing overhead from the rectification zone a vapor phase hydrocarbon raffinate containing the monocyclic aromatic, said raffinate leaving the zone with a significantly reduced phenol content relative to that experienced in the absence of the monocyclic aromatic, cooling the raffinate to obtain a condensate, returning a portion of the condensate as reflux to an upper level of the rectification zone and passing the remainder of said condensate to a fractionation zone, separating the monocyclic aromatic therefrom as distillation overhead and reintroducing it into the lower level of the rectification zone.

2. A process in accordance with claim 1, wherein the monocyclic aromatic introduced into the rectification zone is benzene.

3. A process in accordance with claim 1, wherein cresol is the primary solvent, the aromatic material to be recovered is xylene and the monocyclic aromatic introduced into the rectification zone is toluene.

References Cited in the file of this patent

UNITED STATES PATENTS

| | | |
|---|---|---|
| 2,081,524 | Barnes | May 25, 1937 |
| 2,084,471 | Whiteley | June 22, 1937 |
| 2,406,695 | Lake | Aug. 27, 1946 |
| 2,520,006 | Hibshman et al. | Aug. 22, 1950 |